US006699454B1

(12) United States Patent
Moy et al.

(10) Patent No.: US 6,699,454 B1
(45) Date of Patent: Mar. 2, 2004

(54) CATALYSTS FOR THE MANUFACTURE OF CARBON FIBRILS AND METHODS OF USE THEREOF

(75) Inventors: David Moy, Winchester, MA (US); Asif Chishti, Lowell, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 08/477,576

(22) Filed: Jun. 7, 1995

Related U.S. Application Data

(62) Division of application No. 08/459,534, filed on Jun. 2, 1995, which is a continuation of application No. 08/241,771, filed on May 12, 1994, now abandoned.

(51) Int. Cl.[7] ................................................. D01F 9/12
(52) U.S. Cl. ..................................................... 423/447.2
(58) Field of Search ........................... 423/447.2, 447.3

(56) References Cited

U.S. PATENT DOCUMENTS

| | | | |
|---|---|---|---|
| 3,053,775 A | 9/1962 | Abbott | 252/421 |
| 3,828,101 A | 8/1974 | Miklas | 423/594 |
| 3,872,027 A | 3/1975 | Christmann et al. | 252/430 |
| 4,018,706 A | 4/1977 | Inoue et al. | 252/430 |
| 4,163,775 A | 8/1979 | Foster et al. | 423/363 |
| 4,271,136 A | 6/1981 | Tennison | 423/362 |
| 4,283,308 A | 8/1981 | Ohara et al. | 252/435 |
| 4,663,230 A | 5/1987 | Tennent | 428/367 |
| 4,855,091 A | 8/1989 | Geus et al. | 264/22 |
| 5,039,504 A | 8/1991 | Kageyama et al. | 423/447.3 |
| 5,070,064 A | 12/1991 | Hsu et al. | 502/325 |
| 5,165,909 A | 11/1992 | Tennent et al. | 423/447.3 |
| 5,171,560 A | 12/1992 | Tennent | 423/447.3 |
| 5,202,296 A | 4/1993 | Osborne | 502/158 |
| 5,500,200 A | * 3/1996 | Mandeville et al. | 423/447.3 |

FOREIGN PATENT DOCUMENTS

| | | |
|---|---|---|
| JP | 5015-754 | 7/1975 |
| JP | 5018-878 | 7/1975 |
| JP | 1114-743 | 6/1986 |
| WO | WO 87/07559 | 12/1987 |
| WO | WO 90/07023 | 6/1990 |
| WO | WO 93/24214 | 12/1993 |

* cited by examiner

Primary Examiner—Stuart L. Hendrickson
(74) Attorney, Agent, or Firm—Kramer Levin Naftalis & Frankel LLP; Barry Evans, Esq.

(57) ABSTRACT

A method for the manufacture of a catalyst for the production of carbon fibrils comprising contacting a fibril-forming catalyst or precursors of a fibril-forming catalyst with an effective amount of a surfactant and/or polyol.

A catalyst for the production of carbon fibrils formed by contacting a fibril-forming catalyst or precursors of a fibril-forming catalyst with an effective amount of a surfactant and/or polyol.

Improved carbon fibrils or carbon fibril aggregates free of a continuous carbon thermal overcoat, with graphitic layers substantially parallel to the fibril axis, having a substantially constant diameter from about 1.0 to about 100 nanometers, and possessing enhanced dispersion into other materials and enhanced electrical conductivity in those materials.

29 Claims, No Drawings

CATALYSTS FOR THE MANUFACTURE OF CARBON FIBRILS AND METHODS OF USE THEREOF

This application is divisional of application Ser. No. 08/459,534, filed Jun. 2, 1995, which is a continuation of application Ser. No. 08/241,771, filed on May 12, 1994, now abandoned.

BACKGROUND OF THE INVENTION

Carbon fibrils are vermicular carbon deposits having diameters less than 500 nanometers. They exist in a variety of forms, and have been prepared through the catalytic decomposition of various carbon-containing gases at metal surfaces.

Tennent, U.S. Pat. No. 4,663,230, describes carbon fibrils that are free of a continuous thermal carbon overcoat and have multiple graphitic outer layers that are substantially parallel to the fibril axis. They generally have diameters no greater than 0.1 micron and length to diameter ratios of at least 5. Desirably they are substantially free of a continuous thermal carbon overcoat, i.e., pyrolytically deposited carbon resulting from thermal cracking of the gas feed used to prepare them.

Tubular fibrils having graphitic layers that are substantially parallel to the microfiber axis and having diameters broadly between 1.0 and 100 nanometers have been described in the art. Fibrils having diameters between 3.5 and 75 nanometers, are described in Tennent et al., U.S. Ser. No. 871,676 filed Jun. 6, 1986 ("Novel Carbon Fibrils, Method for Producing Same and Compositions Containing Same"), Tennent et al., U.S. Ser. No. 871,675 filed Jun. 6, 1986 ("Novel Carbon Fibrils, Method for Producing Same and Encapsulating Catalyst"), Snyder et al., U.S. Ser. No. 149,573 filed Jan. 29, 1988 ("Carbon Fibrils"), Mandeville et al., U.S. Ser. No. 285,817 filed Dec. 16, 1988 ("Fibrils"), Mandeville et al., U.S. Ser. No. 285,817 filed Dec. 16, 1988 ("Fibrils"), and McCarthy et al., U.S. Ser. No. 351,967 filed May 15, 1989 ("Surface Treatment of Carbon Microfibers"). Methods for manufacturing catalysts for producing carbon fibrils are described in Moy et al., U.S. Ser. No. 887,307, filed May 22, 1992 ("Improved Methods and Catalysts for the Manufacture of Carbon Fibrils"). All of these patents and patent applications are assigned to the same assignee as the present application and are hereby incorporated by reference.

Fibrils are useful in a variety of applications. For example, they can be used as reinforcements in fiber-reinforced composite structures or hybrid composite structures (i.e. composites containing reinforcements such as continuous fibers in addition to fibrils). The composites may further contain fillers such as a carbon black and silica, alone or in combination with each other. Examples of reinforceable matrix materials include inorganic and organic polymers, ceramics (e.g., lead or copper). When the matrix is an organic polymer, it may be a thermoset resin such as epoxy, bisamaleimide, polyamide, or polyester resin; a thermoplastic resin; or a reaction injection molded resin. The fibrils can also be used to reinforce continuous fibers. Examples of continuous fibers that can be reinforced or included in hybrid composites are aramid, carbon, and glass fibers, alone, or in combination with each other. The continuous fibers can be woven, knit, crimped, or straight.

The composites can exist in many forms, including foams and films, and find application, e.g., as radiation absorbing materials (e.g., radar or visible radiation), adhesives, or as friction materials for clutches or brakes. Particularly preferred are fibril-reinforced composites in which the matrix is an elastomer, e.g., styrene-butadiene rubber, cis-1,4-polybutadiene, or natural rubber.

In addition to reinforcements, fibrils may be combined with a matrix to create composites having enhanced thermal, and/or electrical conductivity, and/or optical properties. They can be used to increased the surface area of a double layer capacitor plate or electrode. They can also be formed into a mat (e.g., a paper or bonded non woven fabric) and used as a filter, insulation (e.g., for absorbing heat or sound), reinforcement, or adhered to the surface of carbon black to form "fuzzy" carbon black. Moreover, the fibrils can be used as an adsorbent, e.g., for chromatographic separations.

Fibrils are advantageously prepared by contacting a carbon-containing gas with a metal catalyst in a reactor at temperature and other conditions sufficient to produce them with the above-described morphology. Reaction temperatures are 400–850° C., more preferably 600–700° C. Fibrils are preferably prepared continuously by bringing the reactor to the reaction temperature, adding metal catalyst particles, and then continuously contacting the catalyst with the carbon-containing gas.

Examples of suitable feed gases include aliphatic hydrocarbons, e.g., ethylene, propylene, propane, and methane; carbon monoxide; aromatic hydrocarbons, e.g., benzene, naphthalene, and toluene; and oxygenated hydrocarbons.

Preferred catalysts contain iron and, preferably, at least one element chosen from Group V (e.g., vanadium), Group VI (e.g. molybdenum, tungsten, or chromium), Group VII (e.g., manganese), Group VIII (e.g. cobalt) or the lanthanides (e.g., cerium). The catalyst, which is preferably in the form of metal particles, may be deposited on a support, e.g., alumina and magnesia.

The carbon fibrils produced by these catalysts have a length-to-diameter ratio of at least 5, and more preferably at least 100. Even more preferred are fibrils whose length-to-diameter ratio is at least 1000. The wall thickness of the fibrils is about 0.1 to 0.4 times the fibril external diameter.

The external diameter of the fibrils is broadly between 1.0 and 100 nanometers and preferably is between 3.5 and 75 nanometers. Preferably a large proportion have diameters falling within this range. In applications where high strength fibrils are needed (e.g., where the fibrils are used as reinforcements), the external fibril diameter is preferably constant over its length.

Fibrils may be prepared as aggregates having various macroscopic morphologies (as determined by scanning electron microscopy) in which they are randomly entangled with each other to form entangled balls of fibrils; or as aggregates consisting of bundles of straight to slightly bent or kinked carbon fibrils having substantially the same relative orientation in which the longitudinal axis of each fibril (despite individual bends or kinks) extends in the same direction as that of the surrounding fibrils in the bundles; or, as aggregates consisting of straight to slightly bent or kinked fibrils which are loosely entangled with each other to form a more open structure. In the open structures the degree of fibril entanglement is greater than observed in the parallel bundle aggregates (in which the individual fibrils have substantially the same relative orientation) but less than that of random entangled aggregates. All of the aggregates are dispersable in other media, making them useful in composite fabrication where uniform properties throughout the structure are desired. In the parallel bundle aggregates the substantial linearity of the individual fibril strands, which are also electrically conductive, makes the aggregates useful in EMI shielding and electrical applications.

The macroscopic morphology of the aggregate is influenced by the choice of catalyst support. Spherical supports grow fibrils in all directions leading to the formation of random, entangled aggregates. Parallel bundle aggregates and aggregates having more open structures are prepared using supports having one or more readily cleavable planar surfaces, e.g., an iron or iron-containing metal catalyst particle deposited on a support material having one or more readily cleavable surfaces and a surface area of at least 1 square meters per gram.

Preferred support materials include the various aluminas (stoichiometries corresponding to $Al_2O_3.H_2O$ or $AlO.OH$), or gamma-alumina ($Al_2O_3$) or magnesia (MgO). Additionally, hydrous aluminas (stoichiometries corresponding to $Al(OH)_3$ or $Al_2O_3.3H_2O$), calcined lightly at temperatures below about 800° C. yield activated aluminas ($Al_2O_3.H_2O$) which retain the platelet morphology of the initial hydrous alumina. These result in highly preferred supports. Such materials are commercially available, e.g., from ALCOA (hydrous and activated aluminas) and Martin Marietta (magnesia). The activated alumina supports yield primarily parallel bundle aggregates, while the magnesia supports yield primarily the more open aggregates. Spherical gamma alumina particles, which yield random entangled aggregates, are available from Degussa.

It is believed that deposition of fibril growth catalysts on supports having planar surfaces allow the fibrils to orient themselves with each other as they grow, creating a "neighbor effect". This leads then to a parallel bundle fibril aggregate in which the areas of all of the individual fibrils have the same relative orientation. The magnesia supports, although having readily cleavable planar surfaces, yield primarily lightly entangled, open net fibril aggregates because they break apart more readily into smaller particles than the activated alumina support during fibril growth, resulting in aggregates that are less ordered than the parallel bundle aggregates but more ordered than the tightly entangled fibril balls. The more readily the oxide and support can form a mixed oxide at the interface between them, the more likely the support is to break apart.

Further details regarding the formation of carbon fibril aggregates may be found in the disclosure of Snyder et al., U.S. patent application Ser. No. 149,573, filed Jan. 28, 1988, and PCT Application No. US 89/00322, filed Jan. 28, 1989 ("Carbon Fibrils") WO 89/07163, and Moy et al., U.S. patent application Ser. No. 413,837 filed Sep. 28, 1989, PCT Application No. US 90/05498, filed Sep. 27, 1990 ("Fibril Aggregates and Method of Making Same") WO 91/05089, and Tennent, et al, U.S. patent application Ser. No. 057,328, filed May 5, 1993 ("Three Dimensional Macroscopic Assemblages of Randomly Oriented Carbon Fibrils and Composites Containing Same"), all of which are assigned to the same assignee as the invention here and are hereby incorporated by reference.

Fibrils are increasingly important in a variety of industrial uses. While known methods of manufacture permit production of small quantities of fibrils, it is important to improve these methods, and in particular the catalysts used in those methods, to increase the yield of fibrils, to improve their quality and to lower their cost of production. It is also desirable to produce carbon fibrils of improved purity.

Furthermore, it is desirable to produce fibrils with enhanced dispersability and electrical conductivity properties. It is important to improve the ability of fibrils to disperse in media. In particular, it is desirable to increase the ability of fibrils to disperse in thermoplastics or engineering plastics. Dispersion of fibrils into media also imparts enhanced electrical conductivity properties to said media.

OBJECTS OF THE INVENTION

It is thus a primary object of the invention to provide improved catalysts for the production of fibrils.

It is a further object of the invention to provide catalysts for the production of fibrils that are more readily dispersed in media.

Another object of this invention is to provide catalysts yielding fibrils capable of imparting enhanced electrical conductivity properties to a media.

It is also an object of the invention to increase the yield and productivity of fibril-producing catalysts.

It is still a further object of the invention to provide improved methods of preparing fibril-producing catalysts.

It is yet another object of this invention to improve the quality and uniformity of fibrils and aggregates thereof.

It is still a further related object of the invention to improve the economics and reliability of fibril manufacture.

SUMMARY OF THE INVENTION

Methods have now been found which yield catalysts that produce substantially superior carbon fibrils and carbon fibril aggregates. These catalysts can be obtained by contacting a fibril-forming catalyst or precursors of a fibril-forming catalyst with an effective amount of a surfactant and/or polyol. The method is preferably carried out by precipitating a fibril-producing metal oxide or compound from an aqueous solution onto slurried particles of a support material in the presence of surfactant and/or polyol.

This invention further provides a catalyst for the production of carbon fibril aggregates produced by the method of contacting a fibril-forming catalyst or precursors of a fibril-forming catalyst with an effective amount of a surfactant and/or polyol. Preferably, the catalyst is formed by precipitating a fibril-producing metal oxide or compound from an aqueous solution onto slurried particles of a support material in the presence of a surfactant and/or polyol.

Also provided by this invention is a volume of carbon fibrils comprising a multiplicity of fibrils that are free of a continuous thermal carbon overcoat, have graphitic layers that are substantially parallel to the fibril axis, and possess a substantially constant diameter. In a preferred embodiment the diameter of the fibrils is from about 4.0 to about 20 nanometers.

The improved methods of making fibril-forming catalysts and the improved catalysts themselves produce superior carbon fibrils and carbon fibril aggregates possessing enhanced dispersion and electroconductivity qualities. The resultant carbon fibrils exhibit improved characteristics that enable fibrils or fibril aggregates to disperse better in a media. Additionally, the carbon fibrils produced by the improved catalysts provided by this invention impart increased electroconductivity to the media in which they are dispersed.

DETAILED DESCRIPTION OF THE INVENTION

The term "fibril-forming catalyst" is used to refer collectively to catalysts for forming discrete carbon fibrils, carbon fibril aggregates or both.

The term "carbon fibrils" when referring to products is used to refer collectively to both discrete carbon fibrils and carbon fibril aggregates, unless the context indicates a different meaning.

This invention provides a method for the manufacture of a catalyst for the production of carbon fibrils comprising contacting a fibril-forming catalyst or precursors of a fibril-forming catalyst with an effective amount of a surfactant and/or polyol. The method for the manufacture of a catalyst for the production of carbon fibrils preferably comprises the steps of forming an aqueous solution of a Period Four transition metal iron compound or a Period Four transition metal and molybdenum compound, forming a slurry of catalyst support particles comprising alumina and/or magnesia particles, precipitating an iron compound or iron and molybdenum compounds onto the alumina and/or magnesia particles in the presence of a surfactant and/or polyol, and then processing the slurry to produce a fibril-forming catalyst.

Preferably, the surfactant is stable at pH levels from about 3 to about 9 and does not itself cause precipitation of ferric oxide or compounds. Members from the usual classes of anionic, cationic or non-ionic surfactants are effective. In one embodiment of the invention the surfactant is non-ionic. The preferred non-ionic surfactants include ethoxylated alkyl phenols, other ethoxylated and/or propoxylated derivatives, and functionalized organosiloxanes.

In another embodiment of this invention, the surfactant is an anti-foaming agent. Examples of anti-foaming agents include substituted nonylphenols, organo-modified polysiloxanes, and emulsified silicone formulations.

In other preferred embodiments of the invention the surfactant can be ethylene oxide-propylene oxide copolymers, substituted alkyl phenols, alkali metal salts of polymeric carboxylic acids, derivatized polyalkylsiloxanes, ethoxylated amines, quaternary amine salts and derivatized nitrogen compounds (such as imidazoles and pyrimidines).

Examples of preferred polyols used in certain embodiments of this invention include glycerine, sucrose and polyethylene glycol.

A preferred method of manufacturing a catalyst for the production of carbon fibrils comprises forming an iron or iron and molybdenum salt solution, forming a slurry of catalyst support particles comprising alumina particles, precipitating iron or iron and molybdenum oxide onto said alumina particles in the presence of a surfactant, anti-foam agent or polyol at a pH of about 6, then filtering and washing the slurry followed by drying at about 140° C. to about 200° C. yield a fibril-forming catalyst.

Embodiments of the invention include, but are not limited to, adding soluble surfactant and/or anti-foam and/or polyol to the iron or iron and molybdenum aqueous solution; adding surfactant and/or anti-foam and/or polyol to the alumina or magnesia slurry; and adding surfactant and/or anti-foam and/or polyol to both the iron or iron/molybdenum aqueous solution and the slurry of alumina or magnesia.

This invention also provides a catalyst for the production of carbon fibrils that are produced by contacting a fibril-forming catalyst or precursors of a fibril-forming catalyst with an effective amount of a surfactant and/or polyol.

Further provided by this invention is a volume of carbon fibrils comprising a multiplicity of fibrils having a morphology consisting of tubes that are free of a continuous thermal carbon overcoat, graphitic layers that are substantially parallel to the fibril axis, and a substantially constant diameter. Preferably, the diameter of the fibrils is from about 4.0 to about 20 nanometers.

The immediate improvement in the catalysts of this invention are seen in the fibrils which they produce. They make more uniform fibrils of smaller diameter (from about 4.0 to about 20 nanometers most preferably 7–10 nanometers) thereby increasing the surface area of fibrils. In addition, the aggregates, which resemble parallel bundle aggregates, are much smaller (approximately 0.1–1 micron, and some as small as about 0.1 micron). This results in fibril aggregates which are much easier to disperse and thereby impart higher electrical conductivity to the dispersed medium. The smaller aggregates also allow for dispersions of fibrils to nearly the individualized state (absence of bundles or other fibril aggregates) leading to open, three-dimensional network mats.

While not wishing to be bound by any theory, it is believed that the improved properties of the fibrils (i.e., improved dispersibilities in thermoplastics and/or polymers, and improved electrical conductivities in these formulations, and the ability to make open, three-dimensional network mats from superior dispersions) results from better dispersion of iron or iron/molybdenum oxide particles which are deposited on the surface of the support in the presence of surfactant, anti-foam agent or polyol. The surfactant, anti-foam or polyol interacts with the surface of the precipitated iron or iron/molybdenum oxide to decrease particle-particle interaction, stabilizing the small aggregate particles by retarding the growth or sintering into larger aggregates. The smaller iron or iron/molybdenum particles also lead to fibrils with smaller average diameters.

One class of surfactants used (although not limited to) are non-ionic, particularly alkylated phenols, ethoxylated alkyl phenols, alkoxylated derivatives and functionalized organosiloxanes. Examples of commercial surfactants which may be classified more narrowly as "dispersants" or "anti-foam agents" are Triton X-100 (ethoxylated nonylphenol, Rohm & Haas) or Anti-Foam A (Organomodified polysiloxane, Sigma).

Again, while not wishing to be bound by any particular theory, it is believed that a second pathway by which these catalysts yield improved fibril aggregates is by facilitating the breaking apart of the support (activated alumina or magnesia) particles. The preferred support for these catalysts are flat, planar hydrous alumina ($Al(OH)_3$) platelets which have been lightly calcined from about 225 to about 800° C. to a composition approaching activated alumina, $Al_2O_3.H_2O$, without any substantial change in the platelet structure. The weight loss on calcination is 27–33 wt % $H_2O$.

The aggregate particles of the support are made up of submicron, flat platelets which are loosely held together into aggregates by binding through surface hydroxyl ions. Iron, or iron/molybdenum oxide particles are deposited on the surface of and the crevices between platelets. These platelets then separate and break apart into smaller platelets from the heat of reaction and the force of the fibrils. The planar structure of the support then orients the individual growing fibrils into a CY macromorphology.

The use of surfactants or polyols are believed to decrease the inter-platelet or inter-particle attractions by exchanging, neutralizing or binding surface hydroxy groups which then allows the plates to be cleaved more easily yielding smaller plates and thereby smaller fibril bundles (sub-micron in size). These smaller bundles (0.1–1 micron) are then easier to disperse than larger bundles (0.5–2 micron) obtained with conventional catalysts.

Again, while not wishing to be bound by any particular theory, it is believed that a second pathway by which these catalysts give improved performance is by facilitating the breaking apart of alumina particles. The preferred slurry support for catalysts are hydrous aluminas (Al(OH)$_3$) which have been lightly calcined to greater than about 27% weight loss.

The aggregate particles of the support are made up of submicron, flat plates which are held together by binding through surface hydroxy ions. Iron oxide particles are deposited on the open surfaces and in the crevices between platelets. As fibrils undergo growth the planar surfaces orient the individual fibrils in the parallel bundle morphology.

The resulting bundles are easier to disperse than conventional larger bundles because the sub-micron dimensions of the plates produce very small bundles (diameters as small as about 0.1 micron). Additionally, the use of surfactants to decrease the inter-particle attractions by exchanging, neutralizing or binding surface hydroxy groups, allows the plates to be cleaved more readily, yielding smaller plates and smaller bundles.

Examples of surfactants, which may also be more narrowly defined as Dispersants or Anti-Foams are Triton X-100 or Tamol-731 (Rohm & Haas), EPO-61 (ethylene oxide-propylene oxide co-polymer from Harcros), HL-36 or Anto-Foam 204 (non-silicone Anti-Foams available from Harcros and Sigma, respectively).

Other preparations combine a surfactant, anti-foam agent, or polyol added through the iron/molybdenum solution and a surfactant added to the slurry of alumina support. The precipitation is carried out as described below. These preparations use other types of surfactants besides antifoams. Other surfactants were formulations of ethylene oxide-propylene oxide co-polymers, substituted alkylphenols, or alkali metal salts of polymeric carboxylic acids. Other surfactant formulations also include derivatized polyalkylsiloxanes, ethoxylated amines, quaternary amine salts, derivatized nitrogen compounds (e.g. imidazoles, pyrimidines) or any of the class of surfactants (cationic, anionic or non-ionic) which are stable at pH levels from about 3 to about 9 and by themselves do not cause precipitation of ferric ions.

Method

All the catalysts were prepared by precipitation of iron and molybdenum oxides at a controlled pH. The surfactant or polyol could be added to the Fe/Mo salt solution from which the oxides were precipitated, to the alumina slurry, or both. The support for all catalyst examples was a hydrous alumina (Al(OH)$_3$ or Al$_2$O$_3$.3H$_2$O) available from Alcoa, designated H-705, which had been lightly calcined between 280–600° C. to give about 27–33 percent weight loss to give an activated alumina with composition Al$_2$O$_3$.H$_2$O).

This invention is illustrated in the examples which follow. The examples are set forth to aid in understanding the invention but are not intended to and should not be construed to in any way, limit the scope of the claims.

EXAMPLE I

A catalyst was made by precipitating iron/molybdenum oxides onto Alcoa H-705 (a hydrous alumina) which had been lightly calcined to about 27 percent weight loss. Precipitation of the oxides was done at a pH of about 6.0 by concurrent addition of ammonium carbonate at relative rates to maintain the pH at about 6.0.

The catalyst slurry was filtered and washed, dried at 140° C. and calcined at 400° C. The yield of fibrils was 24.7 times the weight of catalyst.

EXAMPLE II

Comparative Example: Catalyst Without Surfactant

In an indented multi-neck, 2 l.r.b. flask, 41.4 g activated alumina made from Alcoa H-705 (calcined to 33% weight loss) was slurried with 39.5 g ammonium acetate solution (65% weight in water) and 1000 cc DI water. The slurry was well-stirred for 30 minutes using an overhead stirrer.

Ammonium paramolybdate ((NH$_4$)$_6$Mo$_7$O$_{24}$.4H$_2$O), 2.60 g was dissolved in 50 cc DI water and then added with stirring to 86.1 g of ferric nitrate solution (37.5% weight, 8.65% Fe content in DI water) to form a clear, dark red-brown solution (A).

With a pH meter probe immersed in the alumina slurry and with rapid stirring, solution A was added dropwise concurrently with a 20% weight solution of ammonium carbonate at relative rates of each sufficient to maintain the bulk pH at 6.0±0.2. The mixed oxides of Fe(III) and Mo(VI) were precipitated immediately and adsorbed onto the surface of the alumina particles. After addition of the reagents, the slurry was stirred for 30 minutes.

The slurry was vacuum filtered and the filter cake was washed with a total of 1.5 l DI water either on the filter or by twice reslurrying and refiltering. The washed filter cake was a homogeneous, brown solid with no indication of striated layers or inhomogeneity.

The solids were dried in a forced air oven at 180° C. overnight. Recovery of dried catalyst was 54.7 g. The catalyst was ground by hand and sieved through a 100 mesh screen.

The catalyst was tested. The result is summarized in Table 1.

EXAMPLE III

The procedure used was identical to Ex. 2 except for the Fe/Mo solution, which contained 4.0 g. silicone Anti-Foam A emulsion (Sigma). The solution, with emulsion, was mixed in a Waring blender at low speed for 1 min. prior to addition to the alumina slurry. The resulting emulsion was stable for several hours with no indication of separation. Recovered catalyst was 53.1 g.

EXAMPLE IV

The procedure used was identical to Ex. 2 except that the Fe/Mo solution contained 4.0 g. glycerin. The resulting solution was clear with no precipitation. Recovered catalyst was 51.1 g.

EXAMPLE V

The procedure used was identical to Ex. 2 except that the Fe/Mo solution contained 4.0 g. sucrose. The resulting solution was clear with no precipitation. Recovered catalyst was 48.2 g.

EXAMPLE VI

The procedure was identical to Ex. 2 except that the Fe/Mo solution contained 4.0 g Triton X-100 (alkylated nonyl phenol available from Rohm & Haas). The resulting solution was clear with no sign of precipitation. Recovered catalyst was 51.2 g.

EXAMPLE VII 40 g activated alumina made by lightly calcining ALCOA H-705 (33% weight loss) was slurried with 30 g ammonium acetate solution (65% weight) and 1 liter DI water. Slurry was rapidly stirred for 30 min.

81 g of 37.5% ferric nitrate solution was mixed in a Waring blender with a mix containing 1.0 g Polysiloxane 200, 0.65 cp (Aldrich), 0.12 g. Triton X-100 (Rohm-Haas)

and 100 cc DI water. The resulting emulsion was stable for several hours without separation.

Precipitation and subsequent work-up was carried out as in Ex. 2. Recovered catalyst was 49.8 g.

EXAMPLE VIII

The procedure was similar to Ex. 2. 80 g activated alumina made by lightly calcining ALCOA H-705 (33% weight loss) was slurried with 76.3 g ammonium acetate (65% weight solution) and 1 liter DI water. Slurry was rapidly stirred by an overhead stirrer for 30 min.

The Fe/Mo solution (166.4 g 37.5% ferric nitrate solution plus 5.0 g ammonium paramolybdate dissolved in 100 cc DI water) also contained 7.0 g glycerol and 6.0 g silicone Anti-Foam A emulsion. The formulation was mixed in a Waring blender for 1 min; resulting emulsion was stable for several hours without separation. Precipitation and subsequent work-up was similar to Ex. 2. A total of 3 . DI water was used to wash the filter cake. Recovered catalyst was 106.4 g.

Examples 10–15 describe the preparation of catalysts by addition of surfactant or polyol to the alumina dispersion. The results of catalyst tests are listed in Table 2.

EXAMPLE IX

The procedure used was identical to Ex. 2 except that the alumina slurry (Alcoa H-705, lightly calcined to 27% weight loss) also contained 16.0 g Sigma Anti-Foam 204 (organic, non-silicone). The slurry was well-mixed with an overhead stirrer for 1 hr prior to precipitation of Fe/Mo oxides. The precipitation, filtration, washing, drying, grinding and sieving procedure was identical to Ex. 2. Recovered catalyst was 52.89

EXAMPLE X

The procedure similar to Ex. 10 was used, with the exception that the alumina slurry contained 8.0 g Sigma Anti-Foam 289 (non-silicone) instead of Anti-Foam 204. The remainder of the procedure was identical. Recovered catalyst was 53.36 g.

EXAMPLE XI

The procedure similar to Ex. 10 was used, with the exception that the alumina slurry contained 4.0 g Tamol 731 (Rohm & Haas, Na salt of polymeric carboxylic acids) instead of Sigma Anti-Foam 204. The remainder of the procedure was identical. Recovered catalyst was 51.00 g.

EXAMPLE XII

The procedure similar to Ex. 10 was used, with the exception that the alumina slurry contained 16.0 g Anti-Foam HL-36 (Harcros) instead of Sigma Anti-Foam 204. The remainder of the procedure was identical. Recovered catalyst was 51.37 g.

EXAMPLE XIII

The procedure similar to Ex. 10 was used, with the exception that the alumina slurry contained 16.0 g EPO-61 (ethylene oxide-propylene co-polymer, Harcros) instead of Sigma Anti-Foam 204. The remainder of the procedure was identical. Recovered catalyst was 48.89 g.

EXAMPLE XIV

The procedure similar to Ex. 10 was used, with the exception that the alumina slurry contained 8.0 g Polyethylene Glycol 400 (Aldrich) instead of Sigma Anti-Foam 204. The remainder of the procedure was identical. Recovered catalyst was 51.02 g.

Examples 16–20 describe the preparation of catalysts using surfactants or polyols or both by addition to both the ferric nitrate/ammonium molybdate solution and the alumina dispersion. Test results for these catalysts are summarized in Table 2.

EXAMPLE XV

In a procedure similar to Ex. 2, a catalyst on activated alumina made from Alcoa H-705 by lightly calcining to 27% weight loss was prepared. In this example, the Fe/Mo solution also contained 4.0 g Sigma Anti-Foam A emulsion. The alumina slurry also contained 16.0 g. Sigma Anti-foam 204. The remainder of the procedure was identical. Recovered catalyst was 52.05 g.

EXAMPLE XVI 2 kg alumina made from Alcoa H-705, lightly calcined to 33% weight loss was slurried with 1.5 kg of ammonium acetate solution (65% weight), 50 g Sigma Anti-Foam 204 and 12 gal DI water in a 30 gal reactor also equipped with a Lightnin 4000 top stirrer and an Omega pH probe and controller which delivered a 20% weight solution of ammonium carbonate. The controller was set to maintain the bulk pH of the slurry at 6.0±0.2. The pH of the slurry was adjusted to 6.0.

In a 5 flask, 4.2 kg ferric nitrate solution (37.5% weight, 8.65% weight Fe) was mixed with a solution of 133 g ammonium paramolybdate dissolved in 1 l DI water and 25 g Sigma Anti-Foam A emulsion. The mixture was diluted to 6.0 l and stirred with an overhead stirrer for 30 min. A stable emulsion was obtained. The emulsion was loaded into a 6 gal feed tank.

The Fe/Mo emulsion was fed into the reactor at the rate of 5 min/1 with rapid stirring. The pH was kept at 6.0±0.2 by addition of the 20% weight ammonium carbonate which was controlled by the Omega pH probe/controller.

After the addition of reagents, the slurry was stirred for 1 hr. The solids were collected and washed in a plate and frame filter press. The filter cake was washed until the conductivity of the effluent wash water was less than 1.0 mS.

The filter cake was dried at 275° C. in a forced air oven overnight. Recovered catalyst was 2515 g. The dried catalyst was ground in a hammer mill and sieved to −100 mesh.

EXAMPLE XVII

In a procedure similar to Ex. 16, 80.0 g activated alumina made from Alcoa H-705, lightly calcined to 33% weight loss, was slurried with 76.0 g ammonium acetate solution (65% weight), 10.7 g Harcros EPO-61 surfactant and 1 l DI H$_2$0 in a 3-neck flask. The slurry was well-stirred for 0.5 hr.

In a separate vessel, 170.0 g ferric nitrate solution (37.5% weight, 8.65% weight Fe) was mixed with a solution of 5.3 g ammonium molybdate in 100 cc DI water and 4.0 g Sigma Anti-Foam A emulsion. The mixture was stirred vigorously to yield a stable emulsion.

The remainder of the procedure was identical. Recovered catalyst was 105.8 g.

EXAMPLE XVIII

In a procedure similar to Ex. 16, 50.0 g activated alumina made from Alcoa H-705, lightly calcined to 33% weight loss, was slurried with 48.0 g ammonium acetate solution (65% weight), 10.0 g Harcros Anti-Foam HL-36 and 1.51 l DI water. The mixture was stirred vigorously for 30 min.

Separately, 106.0 g ferric nitrate solution (37.5% weight) was mixed with a solution containing 3.3 g ammonium molybdate in 50 cc DI water, and 3.0 g Sigma Anti-foam A emulsion. The mixture was stirred vigorously to give a stable emulsion.

The precipitation of Fe/Mo oxides and subsequent work-up were identical to Ex 16. Recovered catalyst was 63.39 g.

EXAMPLE XIX

The procedure was identical to Ex. 16, except that the Fe/Mo solution contained 4.0 g glycerin instead of Sigma Anti-Foam A emulsion. The remainder of the preparation was the same as Ex. 16. Recovered catalyst was 52.11 g.

EXAMPLE XX

Tests were conducted to measure the conductivities of the fibrils.

There were two parts to the procedure: 1), sample preparation; and 2), sample measurement. A time gap between the two parts allowed for equilibration the sample temperature; this time gap was as long as was convenient.

The mamp measurement can be done using any conventional electrode assembly at a voltage gradient of 15 v/cm. The actual electrodes were 5 sq-cm and were placed 1 cm apart. 50 g of steel balls were placed in a bottle containing fibrils and were shaken on the Red Devil for 1 min. 0.200 g of fibrils were placed in a plastic beaker (Falcon). 200 g CVS mineral oil were added to a blender cup. The fibrils were then added to the blender and blended for 5 min at speed 7. Contents of the blender were transfered back into the plastic cup; the cup was then covered and placed into a water bath (already set to 25° C.).

Samples were left for 1 hr to equilibrate the temperature.

While samples were still in the water bath at ~25° C., the voltage on the power supply to the cell was set at 15 v. The temperature of the sample was adjusted to 25.0° C. by adding hot or cold water to the bath; the sample was then placed in the Red Devil shaker. The sample was shaken for exactly 30 sec. The sample was immediately taken to the conductivity bench; 30 seconds later the electrodes were placed into the cup; a reading (ma current) was taken after 1.0 min. Conductivity was calculated as follows:

conductivity (kohm–cm)=75/current (in ma)

EXAMPLE XXI

The productivities of the catalyst for producing carbon fibrils was determined in a 1 inch quartz tube reactor using the following procedure: a 1 inch quartz tube was fitted with a ¼ inch thermocouple tube inserted through the bottom. At the tip of the thermocouple tube a plug of quartz wool that had been previously weighed was placed which permitted passage of gas, but not particles of catalyst or fibrils growing on the catalyst. The top of the quartz tube was fitted with a gas line which allowed for a downflow addition of one or more gases, and a modified ball valve which allowed addition of a given charge of powdered catalyst. One opening of the ball was closed off so that it became a cup or sealed cylinder. Catalyst could then be loaded into the cup and the valve assembly sealed. The contents of the cup could then be added to the gas stream without air contamination by turning the valve.

A thermocouple was inserted upward into the thermocouple tube to monitor the reactor temperature. The tube reactor was heated to 680° C. in an Argon stream to purge the reactor after which the gas stream was switched to a mixture of hydrogen and ethylene at a flow rate of 400 and 200 cc/min under standard conditions. A weighed charge of catalyst (about 0.02–0.05 g) was dropped into the downflow gas onto the quartz plug. The reactor was maintained at temperature for about 20 minutes, after which the reactor was cooled in argon and emptied. The weight of carbon fibrils produced was calculated from the total recovered weight and the known weights of the quartz wool plug and the catalyst fed. The yield of carbon fibril, or productivity, was calculated as the weight of carbon produced per weight of catalyst or per weight of iron in the catalyst.

TABLE 1

COMPARATIVE EXAMPLE: CATALYST WITHOUT SURFACTANT

| EXAMPLE # | DESCRIPTION | RESISTIVITY |
|---|---|---|
| 2 | NO surfactant | 660 |

TABLE 2

MODIFIED CATALYSTS

| EXAMPLE # | DESCRIPTION | RESISTIVITY |
|---|---|---|
| 3 | 33%, Anti-Foam A(A—A) | 40 |
| 4 | 27%, Glycerine | 60 |
| 5 | 27%, Sucrose | 80 |
| 6 | 27%, Triton X-100 | 100 |
| 7 | 33%, Trit X/Silicone | 114 |
| 8 | 33%, A—A + Glycerine | 45 |
| 9 | 27%, Anti-Foam 204 | 100 |
| 10 | 27%, Anti-Foam 289 | 400 |
| 11 | 27%, Tamol 731 | 90 |
| 12 | 27%, Anti-Foam HL-36 | 75 |
| 13 | 27%. EP061 | 70 |
| 14 | 27%, Polyethylene Gly | 170 |
| 15 | 27%, A—A + A-204 | 39 |
| 16 | 33%, A—A + A-204 | 75 |
| 17 | 33%, A—A + EP061 | 215 |
| 18 | 33%, A—A + HL-36 | 70 |
| 19 | 33%, Glycerin + A-204 | 80 |

What is claimed is:

1. A carbon fibril or aggregate of carbon fibrils produced using a catalyst formed by the method comprising:
   (a) forming an aqueous solution of a compound comprising iron and optionally at least one element chosen from V, Nb, Ta, Cr, Mo, W, Mn, Tc, Re, Ru, Os, Co, Rh, Ir, Ni, Pd, Pt, or the lanthanides;
   (b) forming a slurry of catalyst support particles;
   (c) precipitating the compound of step (a) onto said support particles in the presence of a surfactant and/or polyol; and
   (d) recovering said support particles from said slurry to produce a fibril-forming catalyst.

2. A fibril or aggregate of fibrils as recited in claim 1, wherein the surfactant is a non-ionic surfactant.

3. A fibril or aggregate of fibrils as recited in claim 2, wherein the non-ionic surfactant is an alkylated phenol, ethoxylate derivative, or a functionalized organosiloxane.

4. A fibril or aggregate of fibrils as recited in claim 1, wherein the surfactant is an anti-foaming agent.

5. A fibril or aggregate of fibrils as recited in claim 4, wherein the anti-foaming agent is a substituted nonylphenol, an organo-modified polysiloxane, or an emulsified silicone formulation.

6. A fibril or aggregate of fibrils as recited in claim 1, wherein the surfactant is stable at pH levels from about 3 to about 9 and does not itself cause precipitation of a metal ion.

7. A fibril or aggregate of fibrils as recited in claim 1, wherein the polyol is selected from the group consisting of glycerine, sucrose and polyethylene glycol.

8. A fibril or aggregate of fibrils as recited in claim 1, wherein the surfactant is sanionic.

9. A fibril or aggregate of fibrils as recited in claim 1, wherein the surfactant is cationic.

10. A fibril or aggregate of fibrils as recited in claim 1, wherein the surfactant is selected from the group consisting of ethylene oxide-propylene oxide copolymers, substituted alkyl phenols, alkali metal salts of polymeric carboxylic acids, derivatized polyalkylsiloxanes, ethoxylated amines, quaternary amine salts, imidazoles and pyrimidines.

11. A fibril or aggregate of fibrils as recited in claim 1, wherein the aqueous solution of step (a) further comprises a soluble polyol.

12. A fibril or aggregate of fibrils as recited in claim 1, wherein the aqueous solution of step (a) further comprises a surfactant.

13. A fibril or aggregate of fibrils as recited in claim 1, wherein the slurry of step (b) further comprises a surfactant.

14. A fibril or aggregate of fibrils as recited in claim 1, wherein the slurry of step (b) further comprises a polyol.

15. A fibril or aggregate of fibrils as recited in claim 1, wherein the aqueous solution of step (a) and the slurry of step (b) further comprise a surfactant.

16. A fibril or aggregate of fibrils as recited in claim 1, wherein the aqueous solution of step (a) and the slurry of step (b) further comprise a polyol.

17. A fibril or aggregate of fibrils as recited in claim 1, wherein said fibril or fibrils are free of a thermal carbon overcoat.

18. A fibril or aggregate of fibrils as recited in claim 1, wherein said fibril or fibrils have diameters between about 4 to about 20 nanometers.

19. A fibril or aggregate of fibrils as recited in claim 1, wherein said fibrils comprise carbon graphitic layers that are substantially parallel to the fibril axis.

20. A carbon fibril or aggregate of carbon fibrils as recited in claim 1, wherein said fibrils have a diameter of from about 7 to about 10 nanometers.

21. A carbon fibril or aggregate of carbon fibrils as recited in claim 1, wherein said aggregates are about 0.1 to 1 micron in size.

22. A carbon fibril or aggregate of carbon fibrils as recited in claim 20, wherein said aggregates are about 0.1 to 1 micron in size.

23. A carbon fibril or aggregate of carbon fibrils as recited in claim 1, wherein said fibril or aggregate of fibrils have at least one resistivity characteristic that is less than 60% of the resistivity characteristic of fibrils or aggregates of fibrils prepared with a catalyst produced without the presence of said surfactant and/or polyol.

24. A carbon fibril or aggregate of carbon fibrils as recited in claim 1, wherein said fibril or aggregate of fibrils have at least one resistivity characteristic that is less than 35% of the resistivity characteristic of fibrils or aggregates of fibrils prepared with a catalyst produced without the presence of said surfactant and/or polyol.

25. A carbon fibril or aggregate of carbon fibrils as recited in claim 1, wherein said fibril or aggregate of fibrils have at least one resistivity characteristic that is less than 20% of the resistivity characteristic of fibrils or aggregates of fibrils prepared with a catalyst produced without the presence of said surfactant and/or polyol.

26. A carbon fibril or aggregate of carbon fibrils produced using a catalyst formed by the method comprising:
  (a) forming an aqueous solution of an iron compound or iron and molybdenum compounds;
  (b) forming a slurry of catalyst support particles;
  (c) precipitating said iron compound or said iron and molybdenum compounds onto said support particles in the presence of a surfactant and/or polyol; and
  (d) recovering said support particles from said slurry to produce a fibril-forming catalyst.

27. A carbon fibril or aggregate of carbon fibrils as recited in claim 23, wherein said fibrils have a diameter of from about 4.0 to about 20 nanometers.

28. A carbon fibril or aggregate of carbon fibrils as recited in claim 27, wherein said aggregates are about 0.1 to 1 micron in size.

29. A carbon fibril or aggregate of carbon fibrils as recited in claim 27, wherein said fibril or aggregate of fibrils have at least one resistivity characteristic that is less than 60% of the resistivity characteristic of fibrils or aggregates of fibrils prepared with a catalyst produced without the presence of said surfactant and/or polyol.

* * * * *